(No Model.) 2 Sheets—Sheet 1.
G. P. & C. R. ANDREWS.
CHUCK.
No. 412,229. Patented Oct. 8, 1889.
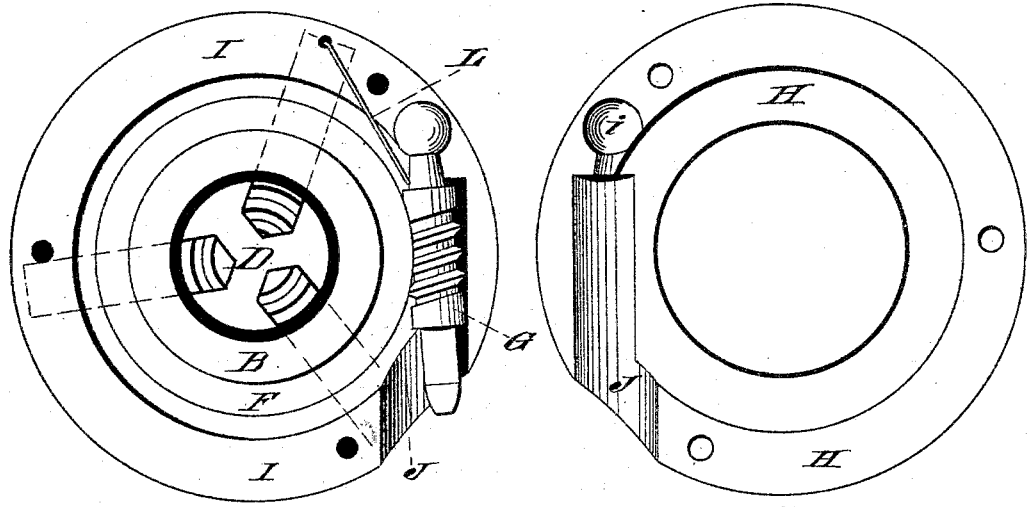
Fig I. Fig II.
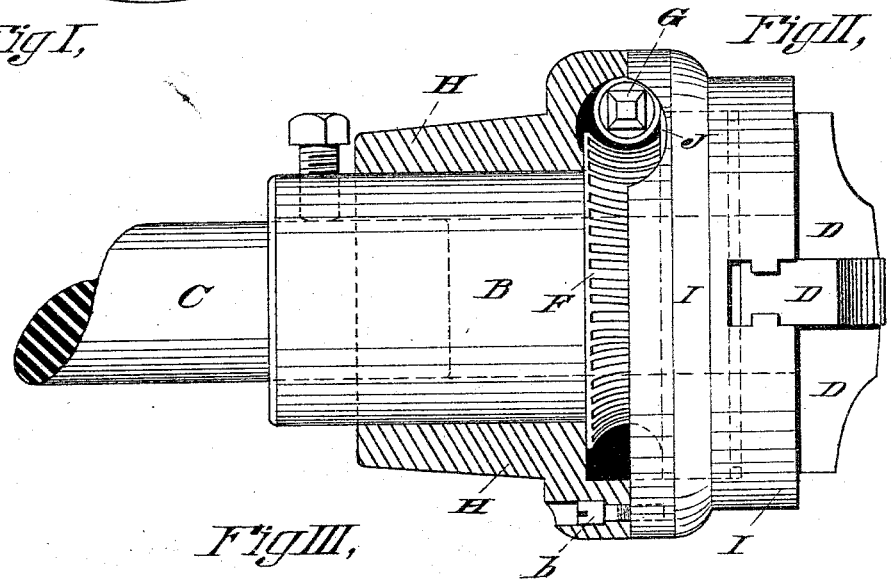
Fig III.
Witnesses,
J. M. Brown
D. Holland
Inventors,
G. P. Andrews,
C. R. Andrews,
By R. F. Hyde
Atty.

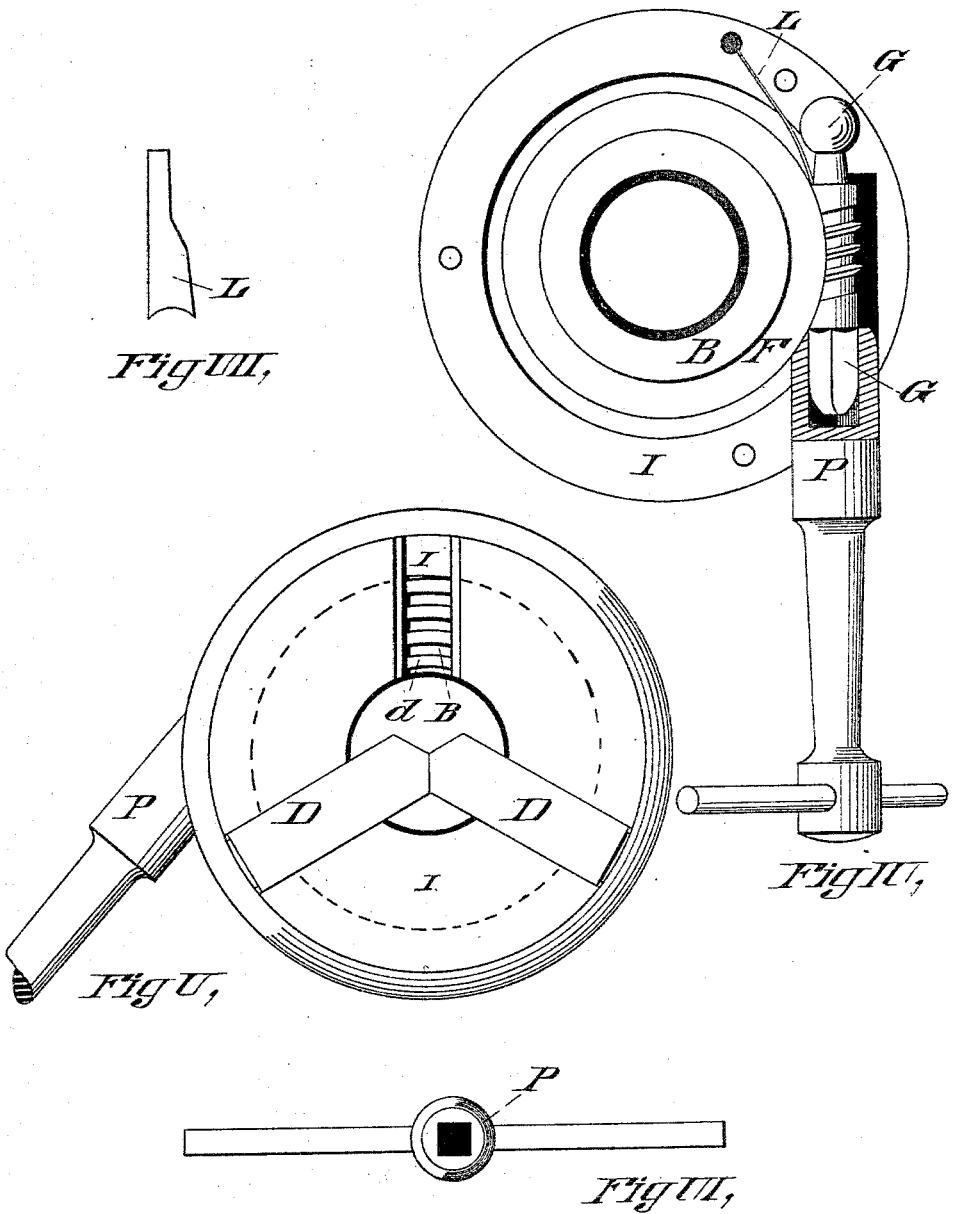

UNITED STATES PATENT OFFICE.

GEORGE P. ANDREWS AND CHARLES R. ANDREWS, OF STAFFORDVILLE, ASSIGNORS TO THE D. E. WHITON MACHINE COMPANY, OF NEW LONDON, CONNECTICUT.

CHUCK.

SPECIFICATION forming part of Letters Patent No. 412,229, dated October 8, 1889.

Application filed January 26, 1888. Renewed November 22, 1888. Serial No. 291,600. (No model.)

*To all whom it may concern:*

Be it known that we, GEORGE P. ANDREWS and CHARLES R. ANDREWS, citizens of the United States, residing at Staffordville, Tolland county, State of Connecticut, have invented a new and useful Improvement in Chucks, of which the following is a specification.

Our improvements relate to that class of chucks in which an outer part is rotated upon an inner part fast to the spindle to bring the jaws against the stock centered in the chuck, and in which when the stock is so centered an auxiliary slower rotation is imparted to the outer part to powerfully clamp the stock between the jaws, and have for their object the convenient application of an increased grip to the jaws, as well as a total absence of friction from the auxiliary mechanism when not in use; and the invention consists in the combination and construction, as hereinafter described, and more particularly pointed out in the claims.

Our invention is fully illustrated in the accompanying drawings, in which—

Figure I is a rear end view of a chuck having our improvements, with one part removed. Fig. II is a front end view of that part of a chuck removed in Fig. I. Fig. III is a plan view of a complete chuck in partial section. Fig. IV is the same as Fig. I, with the parts in a different position and with the addition of an operating-handle shown in partial section. Fig. V is a face view of a chuck with one jaw removed. Fig. VI is a view of the operating-handle, and Fig. VII is a detail view.

B is the inner part of a chuck, adapted to pass over and be secured to a spindle C, and bored out in prolongation of the spindle to receive one end of the stock clamped by the jaws D.

H I are two sections forming, when united, a shell, keyed to the part B to be capable of only a rotary motion thereon.

D are jaws in ways in the face of the section I, transversely and radially arranged to the axis of the part B and spindle C and held in operative contact by the section I to the part B, so that the rotation of the one upon the other will slide the jaws to or from the axis of the mouth of the chuck.

In the drawings the jaws D, confined in ways in the face of section I, are shown held to engage a face-scroll $d$ upon the part B.

These general features of a chuck are old, and we make no claim thereto; but in order that the shell formed of sections H I may be rapidly rotated to bring the jaws D against the stock inserted in the chuck, as well as rapidly rotated to withdraw the jaws therefrom, we combine mechanism with the sections H I and part B, which can be brought into operation, when the jaws are in contact with the stock, to powerfully close them thereupon, and as quickly used to release the jaws and permit the shell to be rotated without friction from said clamping mechanism to withdraw the jaws; and this we construct as follows: Upon the periphery of part B is arranged a worm-gear F, and preferably raised therefrom, as shown, so that one side of said gear may serve as a shoulder to prevent the outer shell from having any longitudinal movement on part B, and the sections H I are correspondingly counterbored at their joint faces to form an annular groove for receiving said gear F. The two sections H I have their joint faces over the center of the gear F, and are held together by screws $b$, passing from the flange of one section into the other, as shown, and the section H, coming against the side of gear F, and the one I closing over the face of part B, hold the shell formed of the two from any but a rotary motion on the part B. Through the sections H I united is bored a hole J at their joint face and to leave an equal counterbore in each face, as shown in Figs. I and II, and said hole is bored tangentially to the perimeter of gear F to end at a point within the joint faces of the two sections, where it forms a socket $i$. Received within hole J, with one end in socket $i$, is a worm-spindle G, of smaller diameter than the hole, so that it is capable of being swung upon one end as a pivot from the center of hole J to one side thereof. The free end of spindle G projects within the mouth of hole J and is squared to be received within the mouth of a corresponding tool. Bearing against the rear end of the spindle G, to normally press it away from the center of hole J and against its side, is one end of a spring L, secured in the face of one of the sections H I.

A tool consisting of a stem beveled to pass readily into the mouth of hole J, having a squared socket adapted to pass over the squared free end of the spindle G and a convenient handle for rotating said tool, enables the spindle to be centered within hole J to have the thread thereon engage with the teeth of the worm-gear F.

When the tool P is not in hole J to center the spindle G therein, the spindle is pressed by its spring out of engagement with the worm-gear F, and the shell of the chuck is free to be rotated quickly by one hand to center the stock or to run the jaws away therefrom, being unretarded by any friction due to clamping mechanism, and when the worm-spindle is brought into operation to clamp the jaws the maximum power for that purpose is obtained.

Now having described our invention, what we claim is—

1. The within-described improved chuck, consisting of the combination, with an inner part adapted to be fixed to a spindle, an outer shell adapted to rotate upon the fixed part, and radial jaws combined with the two to be slid to and from a common center by the rotation of the shell upon the fixed part, substantially as shown and described, of a peripheral worm-gear upon the fixed part, a joint in the outer shell over said worm-gear, a cylindrical hole through the outer shell at its joint tangential to the worm-gear, a socket in the joint faces of the sections of the outer shell in prolongation of the hole therethrough, a worm-spindle of smaller diameter than said hole, having one end pivoted in the socket and its free end extending within the mouth of the hole and adapted to be combined with a corresponding wrench end, a spring fixed to the outer shell and bearing the worm-spindle normally away from the worm-gear, and a wrench adapted to enter the hole in the outer shell, grasp the worm-spindle, and center it in the hole to thereby bring its thread into engagement with the worm-gear, all combined and operating as and for the purpose set forth.

2. In a chuck, the combination of a central core engaging with the jaws of the chuck, adapted to be fitted to a mandrel or spindle and provided with a series of worm-teeth around itself, an outer case carrying the jaws and adapted to turn freely on the central core and provided with a circular opening tangential to the worm-teeth of the central core, a worm-spindle having an angular outer shank mounted loosely within said opening and normally disengaged from the worm-teeth, and a wrench accurately fitting the mouth of said opening and having a socket adapted to receive said shank, whereby as the wrench is inserted thereon the spindle is thrown into engagement with the worm-teeth, substantially as described and shown.

GEORGE P. ANDREWS.
CHARLES R. ANDREWS.

Witnesses:
EDWARD FAIRBANKS,
CHARLES E. PERKINS.